United States Patent [19]

Fuwa

[11] 4,394,338
[45] Jul. 19, 1983

[54] PRODUCTION OF ELONGATED FIBER-REINFORCED COMPOSITE ARTICLES

[75] Inventor: Masaru Fuwa, Abiko, Japan

[73] Assignee: Mitsubishi Petrochemical Company Limited, Tokyo, Japan

[21] Appl. No.: 291,812

[22] Filed: Aug. 10, 1981

[30] Foreign Application Priority Data

Aug. 21, 1980 [JP] Japan .................................. 55-114981

[51] Int. Cl.$^3$ .......................... B29F 3/10; B32B 31/12; B29D 27/00
[52] U.S. Cl. ..................................... 264/135; 264/46.1; 264/46.2; 264/174; 264/338; 425/113; 425/505; 425/817 C
[58] Field of Search ....................... 264/46.2, 46.3, 54, 264/46.5, 45.8, 135, 174, 338, 46.1; 425/113, 505, 817 C

[56] References Cited

U.S. PATENT DOCUMENTS

| 3,029,476 | 4/1962 | Merck et al. | 264/135 X |
| 3,917,774 | 11/1975 | Sagane et al. | 264/46.2 |
| 4,025,256 | 5/1977 | Heller | 264/46.3 X |

FOREIGN PATENT DOCUMENTS

| 48-30137 | 9/1973 | Japan | 264/46.5 |
| 50-8865 | 1/1975 | Japan . | |
| 51-43501 | 4/1976 | Japan . | |

Primary Examiner—Philip E. Anderson
Attorney, Agent, or Firm—Robert E. Burns; Emmanuel J. Lobato; Bruce L. Adams

[57] ABSTRACT

In the pultrusion of a fiber-reinforced plastic, an elongated fiber material impregnated with a thermosetting resin prior to setting is introduced into a long-land die, in which a thermoplastic resin and a lubricant are successively applied onto the outer surface of the impregnated fiber material thereby to make possible smooth drawing of the material through the die. As a result, the thermosetting resin is substantially set within the die, and, moreover, an elongated, fiber-reinforced, plastic composite article is produced at a reasonable speed.

14 Claims, 4 Drawing Figures

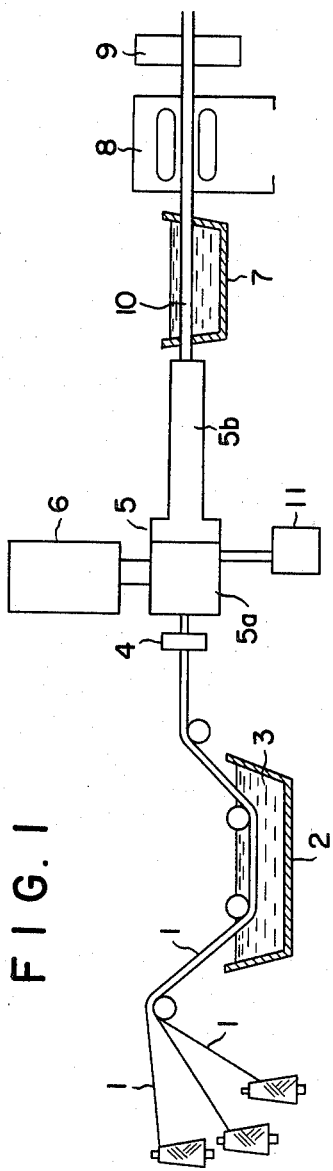
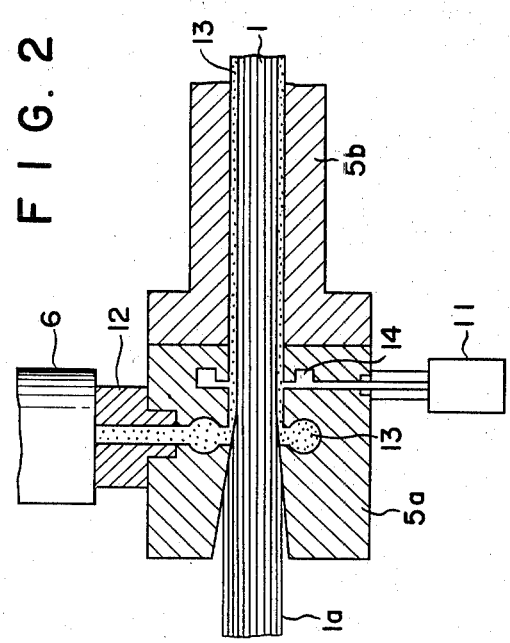

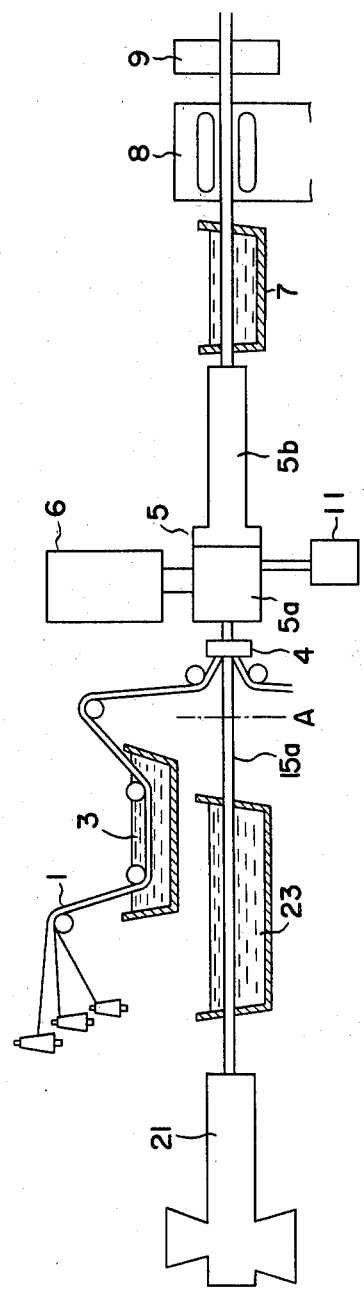
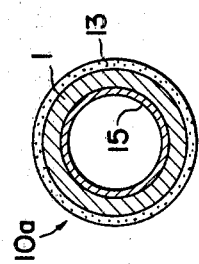

PRODUCTION OF ELONGATED FIBER-REINFORCED COMPOSITE ARTICLES

BACKGROUND OF THE INVENTION

This invention relates to a new process and apparatus for producing generally elongated composite articles of fiber-reinforced thermosetting resins.

More specifically, this invention provides a novel process for continuously producing composite articles of cylindrical shape or other elongated shapes of fiber-reinforced thermosetting resins, which process, unlike the known processes, makes high-speed production of such articles possible.

As a continuous process for producing composite articles of fiber-reinforced thermosetting resins, a so-called pultrusion process, in which a fiber reinforcing material in roving or mat state or a composite structure thereof is impregnated with a thermosetting resin, and the resulting mixture is introduced into a heated die for shaping and setting or curing having a passage of the ultimate product shape thereby to shape and set or cure the same, has heretofore been proposed.

For increasing the production speed in the pultrusion process, the method of elevating the temperature of the setting die and the method of elongating the length of the setting die are conceivable. However, if the temperature is raised too abruptly in the former method, the balance between the raise in viscosity of the resin accompanying its setting and the vaporization of the diluent will collapse, which will give rise to problems such as foaming or early setting of only the outermost layer contacting the die, whereby a great viscosity gradient develops between the outer layer and the inner layer, as a result of which a high internal stress is created in the product and gives rise to a deterioration of the product performance. Furthermore, by the latter method, the length of intimate contact of the resin against the inner surface of the die due to thermal expansion of the resin at the time of its heating becomes long, and, as a result, the resistance to the pultrusion is increased, whereby the length of the die is practically limited.

As a consequence, the present state of the art in pultrusion is such that it is being practiced at a production rate which is much slower than that practiced in general extrusion of thermoplastic resins.

In view of this situation, proposals have been made for solving the above described problems, one of which is disclosed in Japanese Patent Laid Open Publn. No. 8865/1975. The process of this proposal comprises preparing a mixture of a reinforcing fiber material impregnated with a thermosetting resin, coating this mixture with thermoplastic resin in molten state, immediately introducing the coated mixture into a heating air vessel or a hot-water tank, and, as the mixture is shaped by means such as guide rolls, causing it to set. While this proposed process solves the problems of the known pultrusion process, it is accompanied by new problems relating to high-speed forming.

More specifically, in the case where an air vessel is used, if the temperature is raised too much, the coating resin forming the outer surface will deteriorate. In the case of a hot-water tank, there is an upper limit to the temperature of substantially 97° to 98° C.

Even if, at the risk of deterioration of the coating resin, the temperature of the air vessel is raised, or high-temperature heating is sought by using a sealed steam vessel, when the temperature of the coating resin is increased above its melting point, molten resin will adhere to parts such as guide rolls for shaping, or deformation will occur. For this reason, there will still be an upper limit to the temperature, whereby there is a limit to high-speed forming.

Another process is disclosed in Japanese Patent Publn. No. 43501/1976. This proposed process comprises preparing a mixture by impregnating a reinforcing fiber material with a thermosetting resin, coating this mixture with a molten thermoplastic resin, cooling and solidifying the coating surface resin layer, and producing at high speed the intermediate composite material with its interior being unset. The final product is produced by setting this intermediate composite material by a separate suitable heating process.

The most important characteristics of this proposed process are the possibility of setting the unset intermediate material in a state wherein it is shaped in the final product shape such as an arcuate shape or a coil shape and the fact that, by separating the process into the two steps of producing the unset intermediate material and setting, increasing the production rate of each process step has become possible.

However, this process involves cooling a material which has been once heated and then reheating the same, whereby this forming process has the problem of much loss of energy, and it cannot be said to be a desirable process from the standpoint of energy saving.

SUMMARY OF THE INVENTION

This invention provides a new process and apparatus for high-speed continuous production of composite articles of cylindrical or other elongated shapes in which process the above described problems of the prior art are solved.

According to this invention in one aspect thereof, briefly summarized, there is provided a pultrusion process for producing elongated composite articles which comprises the steps of: impregnating an elongated reinforcing fiber material with a thermosetting resin; introducing the fiber material impregnated with the thermosetting resin into a long-land die; extruding, into the long-land die, a thermoplastic resin in molten state onto the external surface of the fiber material thereby to coat the entire outer surface of the fiber material with the thermoplastic resin and thereby to form a composite material; supplying a lubricant between entire outer surface of the composite material and the inner surface of the long-land die; heating and setting the thermosetting resin in the long-land die as the composite material is moved therethrough and shaped; cooling the composite material after it has moved out of the long-land die thereby to solidify the thermoplastic resin, and drawing the cooled composite material to pull the composite material through the long-land die.

According to this invention in another aspect thereof, there is provided an apparatus for carrying out the process.

The nature, utility, and further features of this invention will become more clearly apparent from the following detailed description, beginning with a consideration of basic aspects of the invention and concluding with specific examples of practice thereof and comparison examples, when read in conjunction with the accompanying drawings briefly described below.

BRIEF DESCRIPTION OF THE DRAWINGS

In the drawings:

FIG. 1 is a diagrammatic side elevation, with some parts shown in vertical section, showing an apparatus for practice of one example of the process of this invention;

FIG. 2 is a side view, in longitudinal section, of the essential parts of a long-land die used in this invention;

FIG. 3 is a diagrammatic side elevation similar to FIG. 1 showing another example of the process of the invention; and FIG. 4 is a cross section of a composite article produced by the example process indicated in FIG. 3.

DETAILED DESCRIPTION OF THE INVENTION

Referring first to FIG. 1, continuous-length or elongated, fiber stock material 1 for reinforcement is conducted into a resin-impregnation bath 2 containing a thermosetting resin 3, where the fiber material is impregnated by the resin 3. The reinforcing fiber material thus impregnated is then passed through a squeezing die 4, by which surplus resin is removed, and thereafter the impregnated fiber material is introduced into a long-land die 5 of a total length of 3 to 30 meters (m).

The term "long-land die" herein means a die having a substantially larger portion along its length of a substantially uniform cross-section. The long-land die 5 comprises, essentially, a shaping die 5a with a cross-section changing in the direction of the die length and a setting die 5b of a substantially uniform cross-section. In the shaping die 5a, the impregnated fiber material is shaped into the product shape and, at the same time, is coated over its entire outer surface with a thermoplastic resin in molten state supplied from an extruder 6.

The length of the long-land die 5 differs with the thickness of the product composite material, the kind of the thermosetting resin, and the set temperature of the long-land die. The optimum length of this die 5 is determined from the standpoints of productivity and operativeness, the total length ordinarily being 3 to 30 m, preferably 5 to 20 m. The length of its shaping die 5a is of the order of 0.1 to 0.5 m.

The composite article thus shaped is heated in the setting die 5b connected directly to the shaping die 5a until the thermosetting resin substantially sets. The profiled composite material 10 leaving the setting die 5b is passed through a cooling water bath 7 for cooling the thermoplastic resin coating on the outer surface thereof and is thus cooled to a temperature of room temperature to approximately 60° C. The composite material 10 thus cooled thereafter passes through a drawing machine 8 and is then cut into the required product length by a cutter 9.

A lubricant is supplied from a lubricant supplying device 11 to the interface between the outer surface of the thermoplastic resin around the composite material and the inner surface of the setting die 5b for the purpose of reducing the frictional resistance to the passage of the material through the long setting die.

Referring to FIG. 2, showing a longitudinal section of the shaping die 5a and the upstream end of the setting die 5b, the compound 1a of the reinforcing fiber material 1 impregnated with the unset thermosetting resin 3 (this compound or a layer thereof being hereinafter referred to as FRP compound or FRP layer in some cases even when the thermosetting resin 3 has not set) is uniformly coated with a thermoplastic resin 13 supplied from the aforementioned extruder 6 through an adapter 12. Immediately thereafter, the coating of the resin 13 is further coated with the above mentioned lubricant 14 supplied from the lubricant supplying device 11, and the FRP compound is introduced into the setting die 5b.

The thickness of the coating layer of the thermoplastic resin 13 is preferably in the range of 0.3 to 5 mm, in general, and particularly in the range of 0.5 to 2 mm at the outlet of the setting die 5b, and therefore in the product composite article. Furthermore, thermoplastic resin 13 is preferably supplied at a point within 10 cm before or after completion of shaping of the FRP compound 1a.

The lubricant 14 is preferably fed at a rate such that its coating thickness will be of the order of 0.01 to 0.5 mm, on the assumption that there is no absorption thereof whatsoever by the thermosetting resin. The point in the flow line at which the lubricant 14 is fed is immediately after the supply point of the thermoplastic resin, preferably 1 to 10 cm downstream therefrom.

By thus coating the FRP compound 1a with the thermoplastic resin 13 and further injecting the lubricant 14 between the thermoplastic resin layer 13 and the inner surface of the die, the setting die 5b can be made long with almost no increase in the friction resistance to pultrusion. Therefore, an increase in the production rate is attained. The thermoplastic resin coating is effective in maintaining the lubricating effect and in making the surface of the product smooth.

The process of producing composite articles according to this invention can be used also for producing composite articles of three or more layers. For example, by means of an apparatus as diagrammatically shown in FIG. 3, a composite article 10a of hollow tubular shape having a thermoplastic resin layer 15 on its inner surface as shown in FIG. 4 can be produced. By the use of an extruder 21, a thermoplastic resin is extruded into a tubular form, which is cooled in a cooling bath 23 thereby to obtain a tube 15a.

A fiber material 1 separately impregnated with a thermosetting resin 3 as described hereinbefore is then caused to be laminated by a known method around and along the outer surface of the tube 15a thus obtained. The laminated material thus obtained is then passed through a long-land die 5 to be coated with a thermoplastic resin similarly as in the preceding example illustrated in FIG. 1. In the die 5, the thermosetting resin is thermoset, and the laminated composite material is then extruded and cooled in a cooling bath 7.

In the forming of a hollow composite article of this character, a mandrel can be used, of course, in the exit die of the extruder 21 or in the long-land die 5 as necessary in order to prevent deformation of the article. In this case, also, depending on the necessity, a lubricant may be supplied to the interface between the inner surface and the mandrel.

It will be apparent that, in the apparatus shown in FIG. 3, instead of the tube 15a, a thermoplastic continuous-length or elongated material in the form of a solid bar or a form of some other cross section can be formed or used. Further, in place of the tube 15a, a core material other than a resin, such as a metal, can also be used.

While glass fiber, carbon fiber, Kevlar fiber, as well as fibers of thermoplastic resins such as vinylon and nylon can be used as the reinforcing fiber in the practice of this invention, glass fiber is particularly preferable. The form in which these fibers are supplied is not limited to rovings, and fabrics of these fibers can also be used. Particularly, fiber materials of laminated construction of rovings and chopped strand mats or surfacing mats, such as those used in ordinary FRP pultrusion, can be used, in which case the FRP compound itself constitutes a laminated structure. Furthermore, from the standpoints of strength and economy, the combined use of two or more kinds of the above mentioned fibers is also effective.

For the above mentioned thermosetting resin, unsaturated polyester resins, epoxy resins, phenolic resins, and mixtures of these resins with various fillers can be used. Unsaturated polyester resins are particularly preferable.

Setting or curing of these thermosetting resins is generally effected at a temperature in the range of 100° to 200° C., preferably 120° to 170° C., in 15 seconds to 20 minutes, preferably 15 seconds to 10 minutes in the presence of a hardner such as a peroxide, although these values somewhat varies according to the kind of resin used. Accordingly, in the case where a long-land die of 5 to 20 m is used, a production speed of the order of 0.25 to 80 m/min, preferably 0.5 to 80 m/min., can be attained.

For the thermoplastic resin for surface coating, resins such as polyethylene, polypropylene, polyvinyl chloride, Teflon, and polyvinylidene difluoride can be selected in view of the usage of the product.

Furthermore, for the material to be used on the inner side of the FRP layer in order to produce a composite article of three or more layers, any of thermoplastic resins such as polyethylene, polypropylene, polyvinyl chloride, ABS resins, Teflon, and polyvinylidene difluoride can be used as a solid or foamed body. In addition, a continuous-length foamed body of urethane, a continuous-length foamed resin body reinforced with a metal, or a continuous-length metal body such as a wire or copper tubing can be used. The selection of these materials is made according to the usage of the product. When continuous production is contemplated, however, a material which can be continuously extruded as indicated in FIG. 3 or a continuous-length material which has been wound beforehand in a coil form is desirable.

The lubricant 14 is selected from oily substances which do not vaporize, polymerize, or decompose under the temperature of the setting die 5b during operation and, further, are not absorbed into the thermoplastic resin for coating. Examples of such lubricants are:

(1) polyoxyalkylenes and their derivatives, random, block or graft copolymers of two or more alkylene oxides and their derivatives whose molecular weight is greater than 120 and lower than 100,000;
  alkyl ethers such as polyethylene glycol lauryl ether, alkyl aryl ethers such as polyoxyethylene nonyl phenyl ether, alkyl thioethers such as polyethylene glycol stearyl thioether, alkyl esters such as polyoxyethylene tall oil ester, polyoxyethylene rosin ester, sorbitan alkyl esters such as polyoxyethylene sorbitan monopalmitate, polyoxyethylene sorbitan tristearate, polyoxyethylene sorbitan monooleate, phosphoric esters such as polyoxyethylene dicresyl phosphate, condensation products with amine such as N,N-di(polyoxyethylene)stearylamine, condensation products with amide such as polyoxyethylene stearylamide, polyoxyethylene nonylbenzene sulfonamide, etc.

(2) polyhydric alcohols (including their dehydrated products) having from 4 to 50 carbon atoms and their alkyl esters or ethers;
  polyhydric alcohols such as sorbitan and saccharides, alkyl esters or ethers of polyhydric alcohol (including its dehydrated product) such as dehydrated sorbitan palmitate, esters of polyhydric alcohols and fatty acids such as mono-or diglyceride of linear fatty acids such as palmitic acid, stearic acid, or resin acids such as rhodinic acid, naphthenic acid, caproic ester of pentaerythritol and alkyl esters of saccharose, myristyl galactose ether, etc.

(3) fatty acid alcohol amides having more than 8 total carbon atoms, which are made from fatty acids having from 2 to 30 carbon atoms and alcohols having from 1 to 30 carbon atoms;
  lauryl ethanol amide, stearyl methylol amide, palmityl oxymethyl ethanol amide, etc.

(4) fatty acid amides having from 8 to 90 carbon atoms;
  stearic acid amide, oleic acid amide, etc.

(5) fatty acids having from 8 to 30 carbon atoms and their metal salts;
  fatty acids such as stearic acid, oleic acid, palmitic acid, etc;
  metallic salts of fatty acids such as stearic acid, oleic acid, palmitic acid, lauric acid, 12-hydroxystearic acid, and naphthenic acid, and a metal such as Li, Cu, Be, Mg, Ca, Sr, Ba, Zn, Cd, Al, Ce, Ti, Zr, Pb, Cr, Mn, Co, Ni, Fe, Hg, Ag, Tl, Sn, etc.

(6) esters of polycarboxylic acids having from 6 to 22 carbon atoms and monoalcohols having from 1 to 20 carbon atoms;
  dibutyl phthalate, di-2-ethylhexyl phthalate, dinonyl phthalate, di-n-octyl phthalate, dibutyl sebacate, di-2-ethylhexyl adipate, tri-n-butyl citrate, tri-2-ethylhexyl trimellitate, tri-n-octyl trimellitate, tetra-2-ethylhexyl pyromellitate, etc.

(7) phosphoric acid esters of alkyl alcohols having from 3 to 30 carbon atoms;
  tributyl phosphate, tri-2-ethylhexyl phosphate, etc.

(8) polyesters whose molecular weight is greater than 200 and lower than 30,000;
  polyethylene succinate, polypropylene adipate, polyethylene azelate, poly(1,3-butanediol)sebacate, poly(diethylene glycol)adipate, poly-(1,6-hexanediol)adipate, polypropylene phthalate, etc.

(9) polysiloxanes whose molecular weight is greater then 2,000 and lower than 100,000 such as polydimethylsiloxane, polymethylphenylsiloxane.

Among the above enumerated oily substances silicone oils having a boiling point above 250° C., and oily surfactants also having a boiling point above 250° C. and belonging to the above group (1) such as Unilube 50 MB-168X, Pronon #201, Nissan Nonion NS-210 and Nonion LT-221 manufactured by Nippon Yushi K.K., are particularly preferred. In order to indicate more fully the nature and utility of this invention, the following examples of practice thereof and comparison example are set forth, it being understood that these examples are presented as illustrative only and are not intended to limit the scope of this invention.

EXAMPLE 1

With the use of an apparatus as indicated in FIGS. 1 and 2, and under the conditions set forth below, a solid, rod-shaped composite article was produced.

For the reinforcing fiber material, 25 glass fiber rovings each containing 10,000 filaments each of 13-micron diameter were used. For the thermosetting resin, unsaturated polyester (Yukalac 66-05J mfd. by Mitsubishi Petrochemical Co., Ltd.), in which 2 percent by weight of benzoyl peroxide as a hardner had been admixed was used. Further, for the thermoplastic resin for coating, polyethylene (melting point 120° C.) containing 2 percent by weight of carbon was used and supplied at a point 5 cm downstream from the point where shaping of the FRP compound was completed.

A setting die 5b of an inner diameter of 10 mm and a length of 10 m was used. Silicone oil (TSF 455 manufactured by Toshiba Silicone, K.K.) was used as the lubricant and supplied at a rate of 0.02 liter (l) per minute at a point 3 cm downstream from the point of polyethylene supply. The forming of the composite article was carried out with the setting die 5b heated to a temperature of 150° C. by means of a band heater surrounding the die.

As a result, it was possible to form the rod-shaped composite article continuously at a production speed of 5 m/min. The exterior appearance of the product thus produced was good and was found to be amply set to its central part.

COMPARISON EXAMPLE 1

The process of Example 1 was carried out as specified therein except that the thermoplastic resin coating was omitted.

As a result, a rod was obtained for the initial approximately 3 minutes, but its surface was rough. Furthermore, the lubricating effect soon disappeared, and forming became impossible. The setting die was disassembled, whereupon it was found that resin had adhered to the inner surface of the die. This may be the reason why the resistance to the pultrusion increased.

COMPARISON EXAMPLE 2

The forming process of Example 1 was carried out as specified therein except that, at an intermediate time of the forming operation, the supply of the lubricant was stopped.

As a result, approximately 3 minutes thereafter a product with a rough surface began to come out of the die, and immediately thereafter, drawing out of the product became impossible. The forming operation was therefore stopped. The setting die was disassembled, whereupon it was found that resin was adhering to the inner surface of the die similarly as in Comparison Example 1.

EXAMPLE 2

With the use of the apparatus indicated in FIG. 3 including the extruder 21, and under the conditions set forth below, a laminated composite tube was formed.

A tube of polypropylene was extruded by the extruder 21 and cooled in the cooling tank 23 to obtain a tube 15a of an outer diameter of 34 mm and a wall thickness of 2 mm. Around the outer surface of this tube 15a, 72 rovings 1 of glass fiber impregnated with unsaturated polyester 3 were caused to converge therewith and lie longitudinally therealong. The resulting assembly of materials was passed through the squeezing die 4 and thereafter introduced into the shaping die 5a, where it was covered with a coating of low-density polyethylene of a thickness of about 1 mm and was shaped. A surfactant (Unilube 50 MB-168×manufactured by Nippon Yushi, K.K.) was supplied at a rate of 0.15 l/min. as the lubricant 14.

The composite tube thus formed was then thermoset in a setting die 5b of an inner diameter of 40 mm and a length of 15 m heated to a temperature of 150° C.

As a result, a laminated composite tube of smooth outer surface, of an inner diameter of approximately 30 mm and outer diameter of 40 mm, and a construction as shown in FIG. 4 was continuously produced at a production speed of 10 m/min.

EXAMPLE 3

The procedure of Example 2 was carried out except that, instead of the polypropylene tube of Example 2, as ABS tube of the same diameter was used and supplied at the point A in FIG. 3.

As a result, it was possible to form a composite tube at a speed of 10 m/min.

What is claimed is:

1. A pultrusion process for producing elongated composite articles which comprises the steps of: impregnating an elongated reinforcing fiber material with a thermosetting resin; introducing the fiber material impregnated with the thermosetting resin into a stationary long-land die; extruding, into a shaping portion of the long-land die, a non-foaming thermoplastic resin in molten state onto the external surface of the fiber material thereby to coat the entire outer surface of the fiber material with the thermoplastic resin and thereby to form a composite material; immediately thereafter supplying a lubricant between the entire outer surface of the composite material and the inner surface of the long-land die; heating and setting the thermosetting resin in an elongate setting portion of the long-land die as the composite material is moved therethrough and shaped; cooling the composite material after it has moved out of the land-land die thereby to solidify the thermoplastic resin, and drawing the cooled composite material so as to pull the composite material through said long-land die.

2. A process according to claim 1 in which the lubricant is a silicone oil or an oily surfactant having a boiling point above 250° C.

3. A process according to claim 1 in which the thermoplastic resin is so supplied as to form a coating of a thickness of 0.3 to 5 mm on the fiber material.

4. A process according to claim 1 in which the long-land die has a length of 3 to 30 meters.

5. A process according to claim 1 in which the thermoplastic resin is thus extruded and supplied into the long-land die at a point therein within 10 cm upstream or downstream in the direction of movement of the fiber material from the point at which the shaping of the fiber material impregnated with the thermosetting resin is completed.

6. A process according to claim 1 in which the lubricant is supplied into the long-land die at a point therein 1 to 10 cm downstream in the direction of movement of the fiber material from the point of extruding and supplying of the thermoplastic resin.

7. A process according to claim 1 in which the lubricant is supplied in a manner to form a coating thereof of a thickness of 0.01 to 0.5 mm around the composite material on the basis of there being no absorption of the lubricant by the thermoplastic resin.

8. A process according to claim 1 in which the thermosetting resin is an unsaturated polyester resin, and the fiber material comprises rovings of glass fiber.

9. A process according to claim 1 in which the fiber material impregnated with the thermosetting resin is introduced into the long-land die together with a previously prepared core material so that the fiber material covers the outer surface of the core material thereby to produce a three-layer, laminated composite article.

10. An apparatus for producing composite articles comprising:
   (1) a stationary long-land die through which, from an upstream end to a downstream end thereof, an elongated reinforcing fiber mateial impregnated with a thermosetting resin is passed to be shaped, and which has a length sufficient for thermosetting resin to be substantially set as the fiber material is thus passed;
   (2) a thermoplastic resin supplying device installed at a relatively upstream part of the long-land die and there operating to supply a non-foaming thermoplastic resin in molten state into the die to form a coating of the thermoplastic resin all around the impregnated, elongated fiber material thus passing through the die;
   (3) a lubricant supplying device installed on the long-land die at a part thereof immediately downstream from the thermoplastic resin supplying device and there operating to supply a lubricant into the die and onto the entire outer surface of the coating of the thermoplastic resin;
   (4) cooling means downstream of said long-land die for cooling the composite material after it has moved out of said long-land die to solidify said thermoplastic resin, and
   (5) drawing means downstream of said cooling means for pulling the composite material through said long-land die.

11. Apparatus according to claim 10, comprising upstream of said long-land die, means for extruding a continuous shape of thermoplastic resin, means for cooling said extruded shape and means for covering said extruded shape with fiber material impregnated with a thermosetting resin and passing said covered extruded shape into the upstream end of said long-land die.

12. Apparatus according to claim 10 in which said long-land die has at its upstream end a converging shaping portion for shaping said fiber material, said thermoplastic resin supplying device being installed at a point within 10 cm of the point where shaping of said fiber material is completed.

13. Apparatus according to claim 12, in which said lubricant supplying device is installed at a point 1 to 10 cm downstream of said thermoplastic resin device.

14. Apparatus according to claim 10, in which said long-land die has a total length of from 5 to 20 m.

* * * * *